US012567100B2

(12) United States Patent
Klevenz

(10) Patent No.: US 12,567,100 B2
(45) Date of Patent: Mar. 3, 2026

(54) PRICING INSIGHT APPLICATION

(71) Applicant: SAP SE, Walldorf (DE)

(72) Inventor: Thomas Klevenz, Laudenbach (DE)

(73) Assignee: SAP SE, Walldorf (DE)

( * ) Notice: Subject to any disclaimer, the term of this patent is extended or adjusted under 35 U.S.C. 154(b) by 166 days.

(21) Appl. No.: 18/524,479

(22) Filed: Nov. 30, 2023

(65) Prior Publication Data

US 2025/0182179 A1 Jun. 5, 2025

(51) Int. Cl.
| | |
|---|---|
| *G06Q 30/00* | (2023.01) |
| *G06F 3/0482* | (2013.01) |
| *G06Q 30/0283* | (2023.01) |
| *G06Q 30/0601* | (2023.01) |

(52) U.S. Cl.
CPC ....... *G06Q 30/0631* (2013.01); *G06F 3/0482* (2013.01); *G06Q 30/0283* (2013.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 2011/0093356 A1* | 4/2011 | Hall | ..................... | G06Q 30/02 |
| | | | | 705/26.4 |
| 2018/0158115 A1* | 6/2018 | Wu | ................... | G06Q 30/0601 |
| 2022/0342911 A1* | 10/2022 | Dhir | ................... | G06F 16/2386 |

* cited by examiner

*Primary Examiner* — Ethan D Civan

(74) *Attorney, Agent, or Firm* — Mintz Levin Cohn Ferris Glovsky and Popeo, P.C.

(57) ABSTRACT

A first application generates a first user interface to display a pricing quote to a user. The first application is configured to detect a request by the user for an enhanced view of the pricing quote. In response to detecting such a request, the first application retrieves first data from a second application and second data from a pricing and configuration service. Also, the first application populates a temporary database with the first data and the second data. Additionally, the first application performs data enrichment of the first data and the second data to create third data by translating technical information of the first data and the second data into a user-friendly notation. Finally, the first application generates a second user interface to display, to the user, the third data associated with the pricing quote.

20 Claims, 14 Drawing Sheets

*1000*

*1005*

Generate, by a First Software Application, a First User Interface to Display a Pricing Quote to a User

*1010*

Detect a Request by the User for an Enhanced View of the Pricing Quote

*1015*

Retrieve First Data from a Second Software Application and Second Data from a Third Software Application

*1020*

Populate a Temporary Database with the First Data and the Second Data

*1025*

Perform Data Enrichment of the First Data and the Second Data to Create Third Data by Translating Technical Information of the First Data and the Second Data into a User-Friendly Notation

*1030*

Generate a Second User Interface to Display, to the User, the Third Data associated with the Pricing Quote

Figure 2:
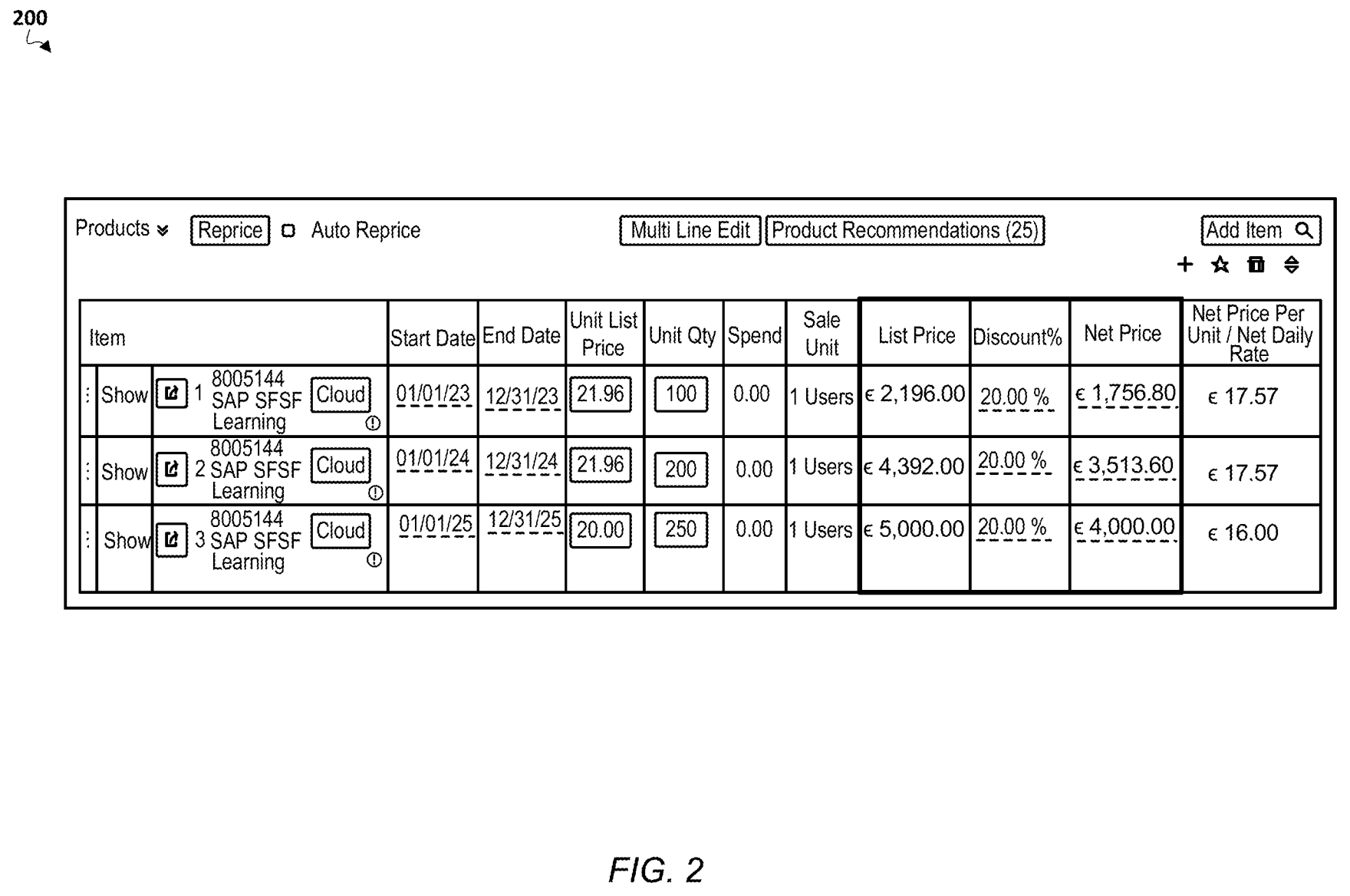

200

Products »  [Reprice]  ☐ Auto Reprice     [Multi Line Edit] [Product Recommendations (25)]     [Add Item 🔍]

+ ☆ 🗑 ⬍

| Item | | Start Date | End Date | Unit List Price | Unit Qty | Spend | Sale Unit | List Price | Discount% | Net Price | Net Price Per Unit / Net Daily Rate |
|---|---|---|---|---|---|---|---|---|---|---|---|
| ⁝ Show ☑ | 8005144 1 SAP SFSF Learning [Cloud] ⊕ | 01/01/23 | 12/31/23 | 21.96 | 100 | 0.00 | 1 Users | € 2,196.00 | 20.00 % | € 1,756.80 | € 17.57 |
| ⁝ Show ☑ | 8005144 2 SAP SFSF Learning [Cloud] ⊕ | 01/01/24 | 12/31/24 | 21.96 | 200 | 0.00 | 1 Users | € 4,392.00 | 20.00 % | € 3,513.60 | € 17.57 |
| ⁝ Show ☑ | 8005144 3 SAP SFSF Learning [Cloud] ⊕ | 01/01/25 | 12/31/25 | 20.00 | 250 | 0.00 | 1 Users | € 5,000.00 | 20.00 % | € 4,000.00 | € 16.00 |

Pricing Document Details

Process type: New Business
Business model: -
Valid until: 23.05.2023
Sold-to party: ABCD Corp

Pricing Details

Pricing date: 23.11.2022
Quote currency: EUR
Cloud pricelist: MPEU –
Master Prices List Euro

Calculation Status

Consistent

Net TCV per Product Type

Cloud  2.8 Mio.

Total Net TCV

2.793.735,99 EUR

◄ | 🖉

Pricing Document Items   Overview Discount/CPI per Product   Yearly overview - Net TCV per product All (10) ⌄

| ID | Product | Product description | Quantity | Quantity Unit | Spend | Net TCV | | Gross value | Net value | Start Date | End Date | |
|---|---|---|---|---|---|---|---|---|---|---|---|---|
| 9910 | 8005144 | SAP SFSF Learning | 100 | USR | 0 | 1.756,80 | EUR | 2.196 | 1.756,8 | 01.01.2023 | 31.12.2023 | ∧ |
| 9911 | 8005144 | SAP SFSF Learning | 200 | USR | 0 | 3.513,60 | EUR | 4.392 | 3.513,6 | 01.01.2024 | 31.12.2024 | ∧ |
| 9912 | 8005144 | SAP SFSF Learning | 250 | USR | 0 | 4.000,00 | EUR | 5.000 | 4.000 | 01.01.2025 | 31.12.2025 | ∧ |
| 9913 | 8006255 | SAP Ariba Discount Management | 1 | PC | 100.000 | 425.736,00 | EUR | 236.520 | 212.868 | 01.01.2023 | 31.12.2024 | ∧ |

| Yearly overview - Net TCV per product | | | | | |
| --- | --- | --- | --- | --- | --- |
| Product | Quote currency | 2022 | 2023 | 2024 | 2025 |
| 8005144 | EUR | | 1.756,8 | 3.513,6 | 4.000 |
| 8006255 | EUR | | 212.868 | 212.868 | 212.868 |
| 8003186 | EUR | | 39.636,16 | 39.636,16 | 39.636,16 |
| 8006115 | EUR | | 352.833,93 | 352.833,93 | 352.833,93 |
| 8005650 | EUR | | 70.566,79 | 70.566,79 | 70.566,79 |
| 8002460 | EUR | | 210.208,6 | 210.208,6 | 210.208,6 |
| 8009027 | EUR | | 42.041,72 | 42.041,72 | 42.041,72 |

Table view - Yearly net value calculation

Only active calculation details (7) | All calculation details (10)

Suchen [Q]   [XLS]

| Step | calculation relevance | Condition origin | Condition type | Condition type description | Condition Value | | Condition basis | Condition rate | Condition rate - unit |
|---|---|---|---|---|---|---|---|---|---|
| 1 | ⚠ No - inactive | Subtotal | | **** Start **** | 0,00 | EUR | 100 | 0 | EUR |
| 42 | ⊘ Yes - active | A - Automatic pricing | ZKP4 | Listprice - Scale | 2.196,00 | EUR | 100 | 1,83 | EUR |
| 100 | ⊘ Yes - active | Subtotal | | Listprice | 2.196,00 | EUR | 100 | 1,83 | EUR |
| 101 | ⚠ No - statistical | A - Automatic pricing | ZKPU | List price per unit | 1,83 | EUR | 100 | 1,83 | EUR |
| 200 | ⊘ Yes - active | Subtotal | | Standard net | 2.196,00 | EUR | 100 | 1,83 | EUR |
| 509 | ⊘ Yes - active | C -- Manually entered | ZKDF | Special Disc(Net) % | -439,20 | EUR | 2.196 | -20 | % |
| 510 | ⊘ Yes - active | Subtotal | | Discounted Net (permanent) | 1.756,80 | EUR | 100 | 1,83 | EUR |
| 652 | ⊘ Yes - active | | | Net Value bef. incr. | 1.756,80 | EUR | 100 | 1,83 | EUR |
| 656 | ⚠ No - statistical | A - Automatic pricing | ZKDK | Net bef. incr. (ann) | 1.756,80 | EUR | 100 | 0 | EUR |
| 660 | ⊘ Yes - active | Subtotal | | Net Value | 1.756,80 | EUR | 100 | 1,83 | EUR |

*1100*

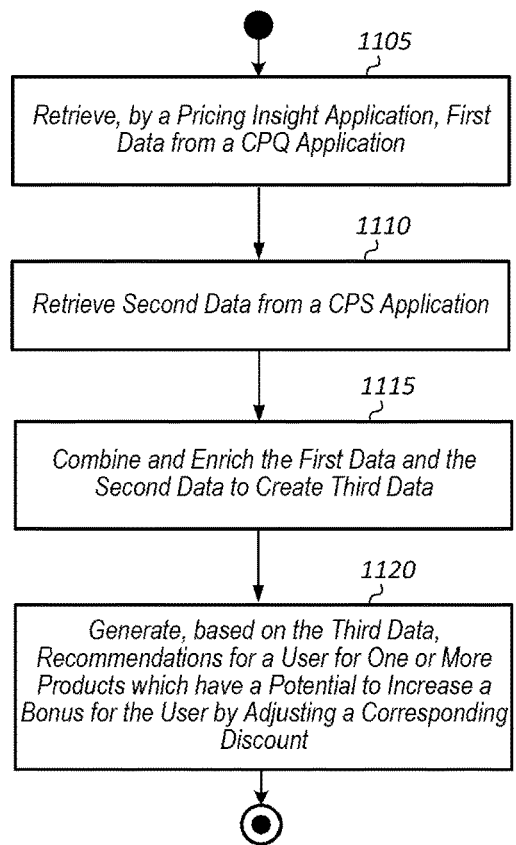

*1105*

Retrieve, by a Pricing Insight Application, First Data from a CPQ Application

*1110*

Retrieve Second Data from a CPS Application

*1115*

Combine and Enrich the First Data and the Second Data to Create Third Data

*1120*

Generate, based on the Third Data, Recommendations for a User for One or More Products which have a Potential to Increase a Bonus for the User by Adjusting a Corresponding Discount

PRICING INSIGHT APPLICATION

TECHNICAL FIELD

The present disclosure generally relates to generating pricing insights for software applications.

BACKGROUND

Different software vendors have different types of applications for enabling sales representatives to configure products, calculate their corresponding prices, and create quotes for customers. For example, SAP CPQ (Configure-Price-Quote), as available from SAP SE, Walldorf, Germany, is SAP's offering for users to configure products, calculate prices, and create quotes for customers. The solution offers the possibility to calculate prices for products with different methodologies, such as via custom scripting or via SAP's Variant Configuration and Pricing Service (CPS). However, the standard solution of CPQ lacks transparency in the price calculation process. For the user (e.g., account executive, sales support, key user) of CPQ, the price calculation is not transparent as CPQ only displays the list price, discount amount, and net price of a product. Consequently, it is not obvious how the prices of items are calculated.

SUMMARY

In some implementations, a first application generates a first user interface to display a pricing quote to a user. The first application is configured to detect a request by the user for an enhanced view of the pricing quote. In response to detecting such a request, the first application retrieves first data from a second application and second data from a pricing and configuration service. Also, the first application populates a temporary database with the first data and the second data. Additionally, the first application performs data enrichment of the first data and the second data to create third data by translating technical information of the first data and the second data into a user-friendly notation. Finally, the first application generates a second user interface to display, to the user, the third data associated with the pricing quote.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates an example of a graphical user interface (GUI) for creating a quote, in accordance with some example implementations of the current subject matter;

FIG. 3 illustrates example of a GUI of a business platform application (BTP) or cloud platform application, in accordance with some example implementations of the current subject matter;

FIG. 5 illustrates an example of a GUI illustrating how the net total contract value (TCV) per product is distributed over individual calendar years, in accordance with some example implementations of the current subject matter;

FIG. 7 illustrates an example of a GUI displaying price calculation details in table form, in accordance with some example implementations of the current subject matter;

FIG. 11 illustrates an example of a process for implementing a pricing insight application, in accordance with some example implementations of the current subject matter;

DETAILED DESCRIPTION

Different software vendors have different types of applications for enabling users to configure products, calculate corresponding prices, and create quotes for customers. For example, SAP CPQ (Configure-Price Quote) is SAP's offering for users to configure products, calculate prices for the configured products, and create quotes for customers. The solution offers the possibility to calculate prices for products with different methodologies, such as via custom scripting or via SAP's Variant Configuration and Pricing Service (CPS). However, the standard solution of CPQ lacks transparency in the price calculation process. For the user (e.g., account executive, sales support, key user) of CPQ, the price calculation is not transparent as CPQ only displays the list price, discount, and net price of a product. Consequently, it is not obvious how prices of items are calculated.

The lack of both an overview of relevant pricing KPIs of a quote and indications of which of the quote's products cause a low margin also hinders users especially in larger quotes to quickly identify opportunities to improve profit margins or their own compensation. Finally, end-users are unable to determine how a given price is calculated when using the existing solutions. As a result, tickets are created which need to be resolved by a sales support team, or the tickets are routed to pricing or IT experts to resolve and explain how prices are calculated. This leads to additional effort to create and resolve the ticket.

In an example, a stand-alone application on SAP's Business Technology Platform (BTP) is implemented, with the stand-alone application running on the Cloud Foundry environment and integrated into a CPQ application. The user can be redirected to the application directly out of the CPQ quote, and after redirection, the BTP application displays the pricing details for the respective quote. In an example, the BTP application combines the data both from the CPQ quote and the detailed pricing information from the CPS. As a result, the BTP application provides both a summary of relevant pricing KPIs of the quote and a detailed overview how the price of individual line items is calculated.

Figure 1:
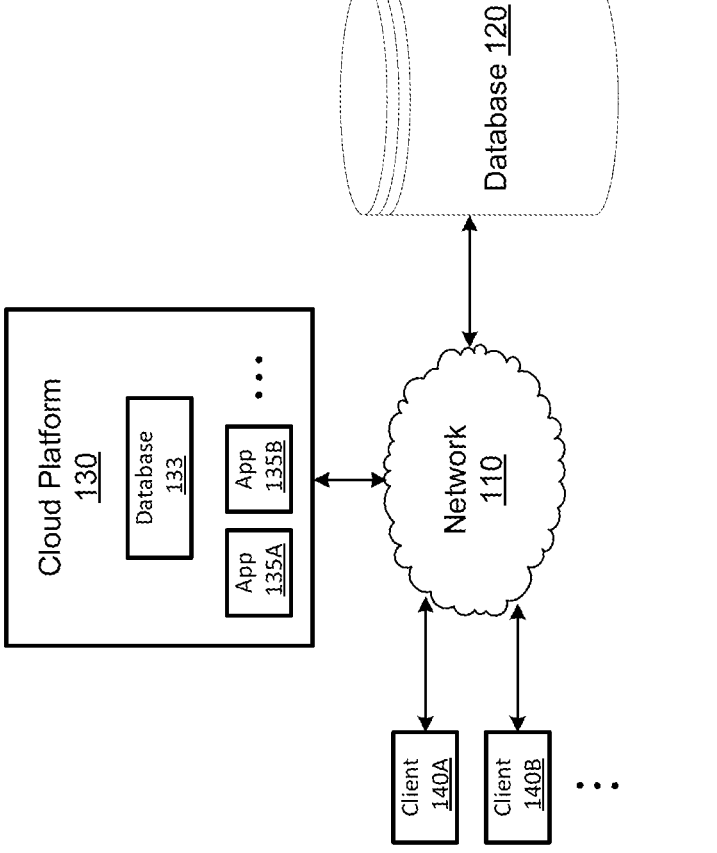
FIG. 1 illustrates a block diagram of a system, in accordance with some example implementations of the current subject matter.

FIG. 1 depicts a diagram illustrating an example of a system 100 consistent with implementations of the current subject matter. Referring to FIG. 1, the system 100 may include a cloud platform 130. The cloud platform 130 may provide resources that can be shared among a plurality of tenants. For example, the cloud platform 130 may be configured to provide a variety of services including, for example, software-as-a-service (SaaS), platform-as-a-service (PaaS), infrastructure as a service (IaaS), and/or the like, and these services can be accessed by one or more tenants of the cloud platform 130. In the example of FIG. 1, the system 100 includes a first tenant 140A (labeled client) and a second tenant 140B (labeled client as well), although system 100 may include any number of other tenants. For example, multitenancy enables multiple end-user devices (e.g., a computer including an application) as well as multiple subscribing customers having their own group of end-users with an isolated context of the particular customers to access a given cloud service having shared resources via the Internet and/or other type of network 110 or communication link(s).

The cloud platform 130 may include resources, such as at least one computer (e.g., a server), data storage, and a network (including network equipment) that couples the computer(s) and storage. The cloud platform 130 may also include other resources, such as operating systems, hypervisors, and/or other resources, to virtualize physical resources (e.g., via virtual machines) and provide deployment (e.g., via containers) of applications (which provide services, for example, on the cloud platform, and other resources). In the case of a "public" cloud platform, the services may be provided on-demand to a client, or tenant, via the Internet. For example, the resources at the public cloud platform may be operated and/or owned by a cloud service provider (e.g., Amazon Web Services, Azure), such that the physical resources at the cloud service provider can be shared by a plurality of tenants. Alternatively, or additionally, the cloud platform 130 may be a "private" cloud platform, in which case the resources of the cloud platform 130 may be hosted on an entity's own private servers (e.g., dedicated corporate servers operated and/or owned by the entity). Alternatively, or additionally, the cloud platform 130 may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In various embodiments, the cloud platform 130 provides services to client 140A-B. Each service may be deployed via a container, which provides a package or bundle of software, libraries, and configuration data to enable the cloud platform to deploy during runtime the service to, for example, one or more virtual machines that provide the service to client 140A. The service may also include logic (e.g., instructions that provide one or more steps of a process) and an interface. The interface may be implemented as an Open Data Protocol (OData) interface (e.g., HTTP message may be used to create a query to a resource identified via a URI), although the interface may be implemented with other types of protocols including those in accordance with REST (Representational state transfer).

In the example of FIG. 1, there are two databases 133 and 120, although other quantities of databases may be implemented as well. The first database 133 is internal to the cloud platform 130, but the second database 120 is external to the cloud platform 130, so an external REST type call may be used to send queries and receive responses from database 120. For example, when the interface is configured in accordance with REST or the ODATA protocol, the interface may access a data model, such as the client tenant schema associated with client 140A's data at database 120. And the interface may provide a REST or Open Data Protocol (ODATA) interface to external applications and/or services, which in this case is the database 120. In the case of REST compliant interfaces, the interface may provide a uniform interface that decouples the client and server, is stateless (e.g., a request includes all information needed to process and respond to the request), cacheable at the client side or the server side, and the like. It is noted that database 120 may also be referred to herein as an external database.

To illustrate further, the client 140A may cause execution of a process or job on application 135A or application 135B. Applications 135A-B are representative of any number and type of applications running on cloud platform 130. For example, applications 135A-B may include one or more of a pricing insight application, a CPQ application, a CPS application, and so on. More details on the operation of a pricing insight application, a CPQ application, and a CPS application to generate and display more detailed pricing information on customer quotes will be provided throughout the remainder of this disclosure.

In an example, an action or a condition at client 140A may cause a message querying or requesting a response from application 135A. If the response from application 135A requires a query to the database 120 in order to obtain data associated with the query, a REST call may be made to database 120. Application 135A may receive a response to the query from the database 120. The response may be compliant with REST as well. At least a portion of the noted process may execute at the cloud platform 130 (although a portion may execute at the client 140A as well). Alternatively, or additionally, the noted process may include a service extension. The service extension may represent a modification in the process (e.g., added step(s) and/or deleted step(s)) specific to, or uniquely for, the client 140A. In other words, the service extension may customize at least a portion of the process for the client 140A.

Turning now to FIG. 2, an example of a graphical user interface (GUI) 200 for creating a quote is shown, consistent with implementations of the current subject matter. In an example, an account executive creates a quote for a customer in a Configure-Price-Quote (CPQ) application using GUI 200. The account executive may add the relevant products to the quote. Also, the account executive may enter the desired discount for the individual line items, and then the respective list and net prices are calculated. The CPQ application shows the list price, discount and net price of the individual line items in GUI 200, but the CPQ application does not show information of how the list and net prices are calculated, such as when there are additional automatically calculated discounts and/or complex list price calculations. In case the user wants to see details for how the price of an item was calculated or if the user wants to have a better overview of relevant quote pricing KPIs, the user can click a link in the CPQ quote which will redirect the user to a business platform application.

Referring now to FIG. 3, an example of a GUI 300 of a business technology platform (BTP) application or cloud platform application is shown, consistent with implementations of the current subject matter. In an example, the BTP application opens and selects the relevant data from both a CPQ application and a Configuration and Pricing Service (CPS). Consequently, GUI 300 shows details with a focus on pricing for the relevant CPQ quote (e.g., total net Total contract Value (TCV), Net TCV distributed per product type, solution area).

Figure 4:
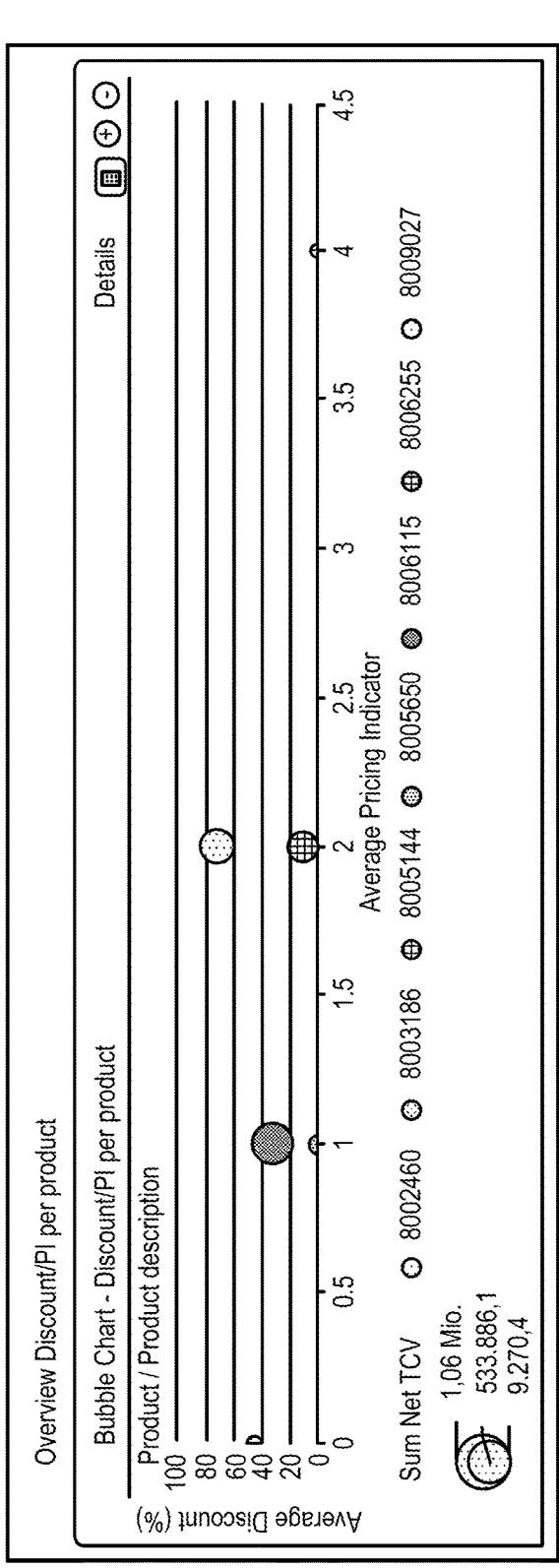
FIG. 4 illustrates an example of a GUI of a bubble chart of a pricing indicator per product, in accordance with some example implementations of the current subject matter.

Turning now to FIG. 4, an example of a GUI 400 of a bubble chart of a pricing indicator per product is shown, consistent with implementations of the current subject matter. In an example, GUI 400 includes a section displaying an overview of which products of the quote have the biggest net total contract value (TCV), the highest discount, and an overview for the pricing indicator. With the help of the overview, the account executive can quickly determine for which products the discounting can be improved and for which products that discounting has the biggest impact, based on the bubble size and based on their share of the total TCV of the quote. The account executive can also determine which products have a negative impact on the account executive's compensation (based on the pricing indicator).

For example, in GUI 400, the higher the value of the product, the larger the bubble used to represent the product in the bubble chart. This allows a user to quickly identify and focus on the products that have the highest value. Also, in an example, items that appear further to the right have a relatively higher potential for increasing the bonus of the sales representative if the sales representative changes the discounts that are applied to these items.

In an example, a bubble chart may show three important pricing information details in a single chart: the net total contract value, the average discount, and the pricing indicator. In an example, the size of the bubble corresponds to the net total contract value, allowing the account executive to see directly how much of the value comes from a specific product in the quote. Also, in an example, the further the bubble appears in the y-direction (corresponding to the y-axis) in the chart indicates the higher an amount of a discount that is given. In other words, the further the bubble is vertically toward the top of the chart, the more discount that is given while the further the bubble is toward the bottom of the chart, the less the discount that is given. Additionally, in an example, the pricing indicator is shown in terms of the x-axis (i.e., horizontally), with a location of the bubble further to the right indicates better pricing based on discount and defined price points.

Referring now to FIG. 5, an example of a GUI 500 illustrating how the net total contract value (TCV) per product is distributed over individual calendar years is shown, consistent with implementations of the current subject matter. GUI 500 shows a listing with each row corresponding to a product and each column corresponding to a given year. Through the use of GUI 500, the user gets an overview of how the net TCV per products is distributed over the individual calendar years. The distribution over individual calendar years may be used for products with a duration (e.g., with a start date and an end date) such as subscription products. The listing may be dynamically changed to show the values per individual month, quarter, or year. Additionally, instead of a table listing, the values may also be shown as bar charts to directly identify which products have the highest share per month, per quarter, and per year.

Figure 6:
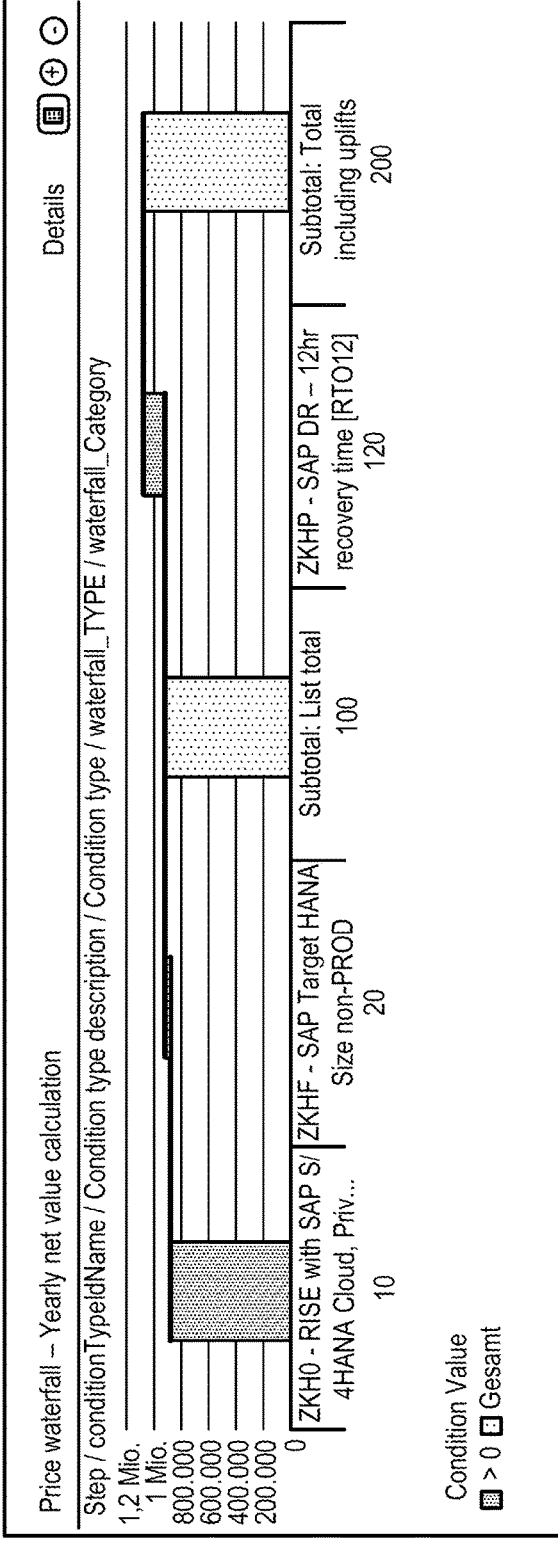
FIG. 6 illustrates an example of a GUI displaying a price waterfall chart, in accordance with some example implementations of the current subject matter.

Turning now to FIG. 6, a GUI 600 displaying a price waterfall chart is shown, consistent with implementations of the current subject matter. In cases where the user wants to get details on how the price of an item is calculated, the user can click on the respective item in the item section of a user interface such as GUI 300 (of FIG. 3). Then, after the user clicks on the respective item, the item details and price calculation details will be displayed to the user.

The price calculation details may be displayed in a variety of ways. In an example, the price calculation details are shown using a price waterfall chart. For example, the price waterfall chart of GUI 600 shows all prices, surcharges, discounts, and sub-totals so that the way the price is calculated can quickly be identified. This helps the user in understanding the specific details behind how prices are being generated.

Referring now to FIG. 7, a GUI 700 displaying price calculation details in table form is shown, in accordance with some example implementations of the current subject matter. GUI 700 illustrates price calculation details in the format of a table. In an example, all price calculation details from the pricing procedure (either CPS or custom pricing scripts) are shown in table form in GUI 700. If the user (e.g., key-user, IT consultant) wants to see additional details regarding specific pricing calculation steps or conditions, the user can click on a specific step of the pricing schema. As a result, the user gets more details regarding the specific step (e.g., rounding rule, currency conversion details, condition customizing details).

Figure 8:
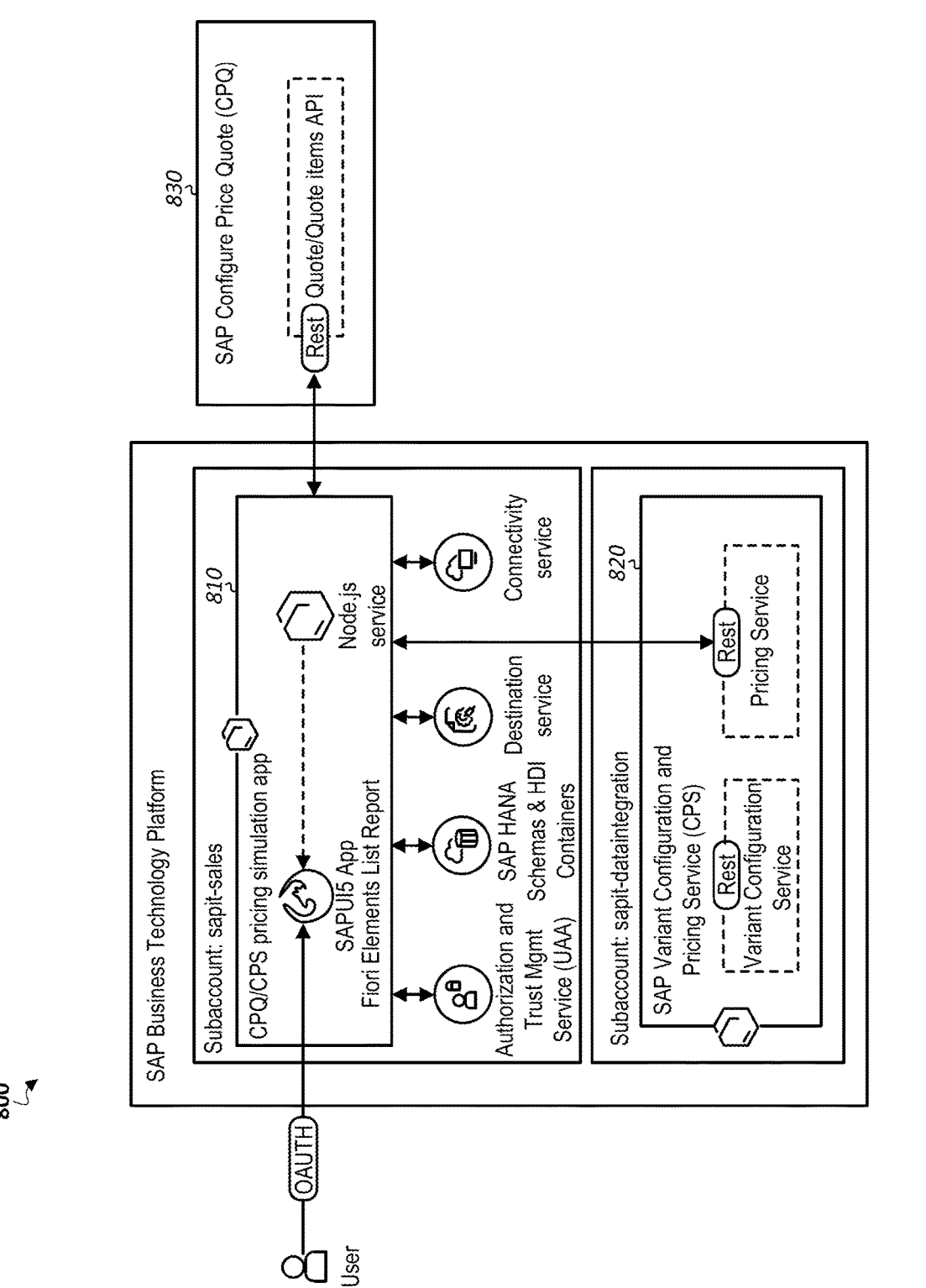
FIG. 8 illustrates a diagram of a system, in accordance with some example implementations of the current subject matter.

Turning now to FIG. 8, a block diagram illustrating a system 800 for implementing the various methods and processes described herein is shown, consistent with embodiments of the current subject matter. In an example, the business technology platform (BTP) application 810 may be developed according to the Cloud Application Programming (CAP) model. In this example, BTP application 810 consists of a backend (based on node.js) and an SAP UI5 application as a frontend. When the BTP application 810 is opened for a specific CPQ quote, the BTP application 810 selects the data from CPQ 830 and from SAP Variant Configuration and Pricing Service (CPS) 820. For the connections to these external systems, the Destination service, Connection service, and Authorization and Trust Management Service (UAA) may be used. The data may be temporarily stored in a temporary database so that the data can be displayed in the UI.

The BTP application 810 is an enhancement to the CPQ product with the ability to show details of how the prices of products are calculated. The BTP application 810 combines both the capabilities of CPQ 830 and CPS 820. In the standard solution of CPQ 830, the price calculation details are not visible for the user. As a result, users cannot check how prices are calculated and cannot evaluate if prices are calculated as expected. As an additional benefit, the BTP application 810 provides a general pricing overview of the quote to provide guidance to users in order to quickly identify the potential for margin or compensation improvements. The BTP application 810 enhances self-service capabilities for account executives who can get insight into pricing on their own behalf. As a result, operations processes can be streamlined as there will be fewer tickets created which need to be resolved by sales support team, by pricing experts, or by IT staff.

Figure 9:
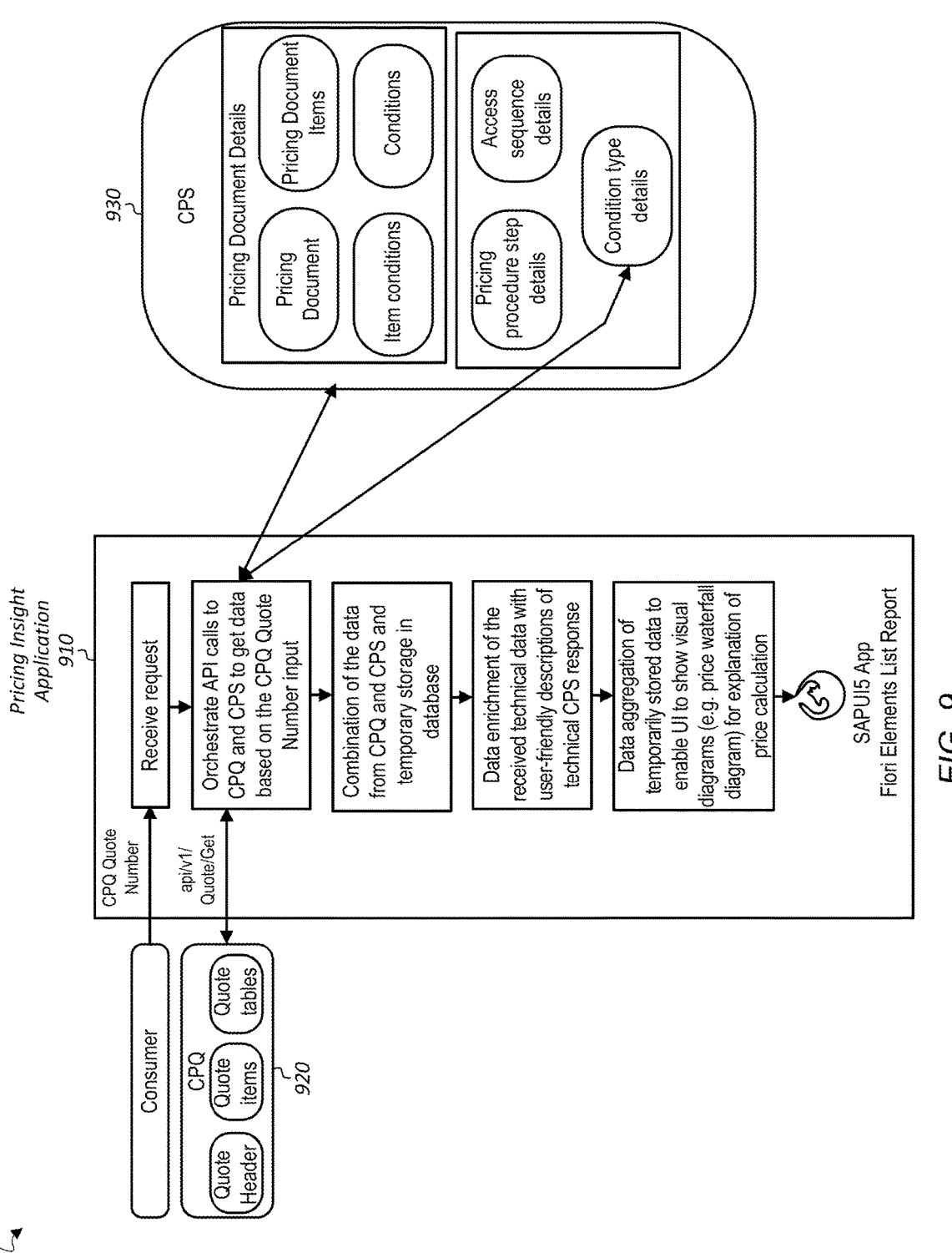
FIG. 9 illustrates a diagram of a system, in accordance with some example implementations of the current subject matter.

Referring now to FIG. 9, a block diagram illustrating a system 900 for implementing the methods and processes described herein is shown, consistent with embodiments of the current subject matter. In an example, the pricing insight application 910 may be used in an internal sales process as an addition to CPQ 920 to get a better overview how prices are calculated. The pricing insight application 910 enhances CPQ 920 and CPS 930 which only display the final calculated prices of CPS 930 in the quote (e.g., list price, net price) without any information on how the price is calculated. It is noted that CPS 930 may also be referred to as a pricing and configuration service or as a pricing service.

In an example, the user or the consuming application calls the pricing insight application 910 with the CPQ Quote number in the URL as an input parameter. The pricing insight application 910 receives the request and orchestrates several requests to CPQ 920 and CPS 930 to retrieve the relevant data for explaining the pricing calculation steps and for providing further insights into Quote KPIs (e.g., Quote, item, quote table data from CPQ 920, pricing specific data from CPS 930, pricing document information, pricing condition customizing information).

Afterwards, the received data is stored temporarily in a combined manner in a database (e.g., database 133 of FIG. 1) in a cloud platform (e.g., cloud platform 130). The result is a combination of the quote-specific data from CPQ 920 and the data from CPS 930 which contains the information on how the prices were calculated. Additionally, the pricing insight application 910 translates and enriches the received data with user-friendly descriptions as the native CPS data is not readable for end-users but only provided in a technical format. Therefore, this translation step is performed so that the CPS data can be provided to end-users in a user-friendly way.

As a last step, the pricing insight application 910 creates additional database entities by aggregating the temporarily stored data to enable the UI to show diagrams which explain the price calculation process (e.g., in the form of a price waterfall diagram). The stored data in the database, which is now available in a combined, aggregated and also user-friendly format, may now be consumed by a Fiori application to display the desired output (e.g., tables, diagrams).

Figure 10:
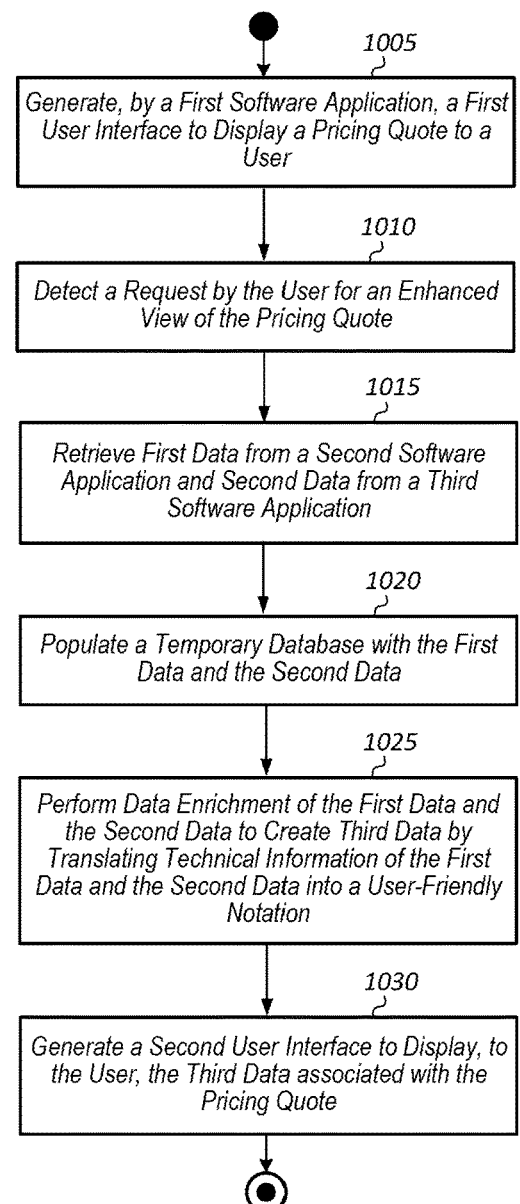
FIG. 10 illustrates an example of a process for aggregating and enriching data associated with a pricing quote so as to generate a user-friendly graphical user interface, in accordance with some example implementations of the current subject matter.

Turning now to FIG. 10, a process for aggregating and enriching data associated with a pricing quote so as to generate a user-friendly user interface is shown, in accordance with some example implementations of the current subject matter. A first software application generates a first user interface to display a pricing quote to a user (block 1005). While displaying the first user interface to the user, the first software application detects a request by the user for an enhanced view of the pricing quote (block 1010). In an example, the first software application detects the user selecting (i.e., clicking on) a graphical element in the first user interface, where the selecting of the graphical element initiates the generation of the enhanced view of the pricing quote.

In response to detecting the request, the first software application retrieves first data from a second software application and second data from a pricing and configuration service (block 1015). In an example, the second software application is a CPQ application. It is noted that the pricing and configuration service may be referred to more generally as a pricing service. Next, the first software application populates a temporary database with the first data and the second data (block 1020). Then, the first software application performs data enrichment of the first data and the second data to create third data by translating technical information of the first data and the second data into a user-friendly notation (block 1025). Next, the first software application generates a second user interface to display, to the user, the third data associated with the pricing quote (block 1030). In an example, data from the temporary database is used to populate the second user interface displaying one or more of bubble charts, price waterfall diagrams, and so on. Additionally, the second user interface may include user-friendly views such as a price summary screen as well as a detail screen showing how prices are calculated. After block 1030, method 1000 may end. Any of the components of the computing systems described herein may be employed to perform method 1000.

Referring now to FIG. 11, a flow diagram illustrating a process for implementing a pricing insight application is shown, in accordance with some example implementations of the current subject matter. A pricing insight application (e.g., pricing insight application 910 of FIG. 9) retrieves first data from a CPQ application (e.g., CPQ application 920) (block 1105). Also, the pricing insight application retrieves second data from a pricing and configuration service (e.g., CPS application 930) (block 1110). Next, the pricing insight application combines and enriches the first data and the second data to create third data (block 1115). In an example, the combining and enriching of the first data and the second data involves translating the first data and the second data from a technical format into the third format which is a user-friendly format enabling a sales representative to obtain a more detailed view of a pricing quote. Then, the pricing insight application generates, based on the third data, recommendations for a user (e.g., a sales representative) for one or more products which have a potential to increase a bonus for the user by adjusting a corresponding discount (block 1120). After block 1120, method 1100 may end. For example, in a quote for a customer with a relatively large number of line items (e.g., hundreds of products), the recommendations may highlight products where the user may derive a benefit by applying a different discount. This helps the user determine the best candidates for adjustments without requiring the user to scroll through and evaluate each line item individually, which can potentially save the user a considerable amount of time that they would otherwise spend in performing their own analysis. Any of the components of the computing systems described herein may be employed to perform method 1100.

Figure 12:
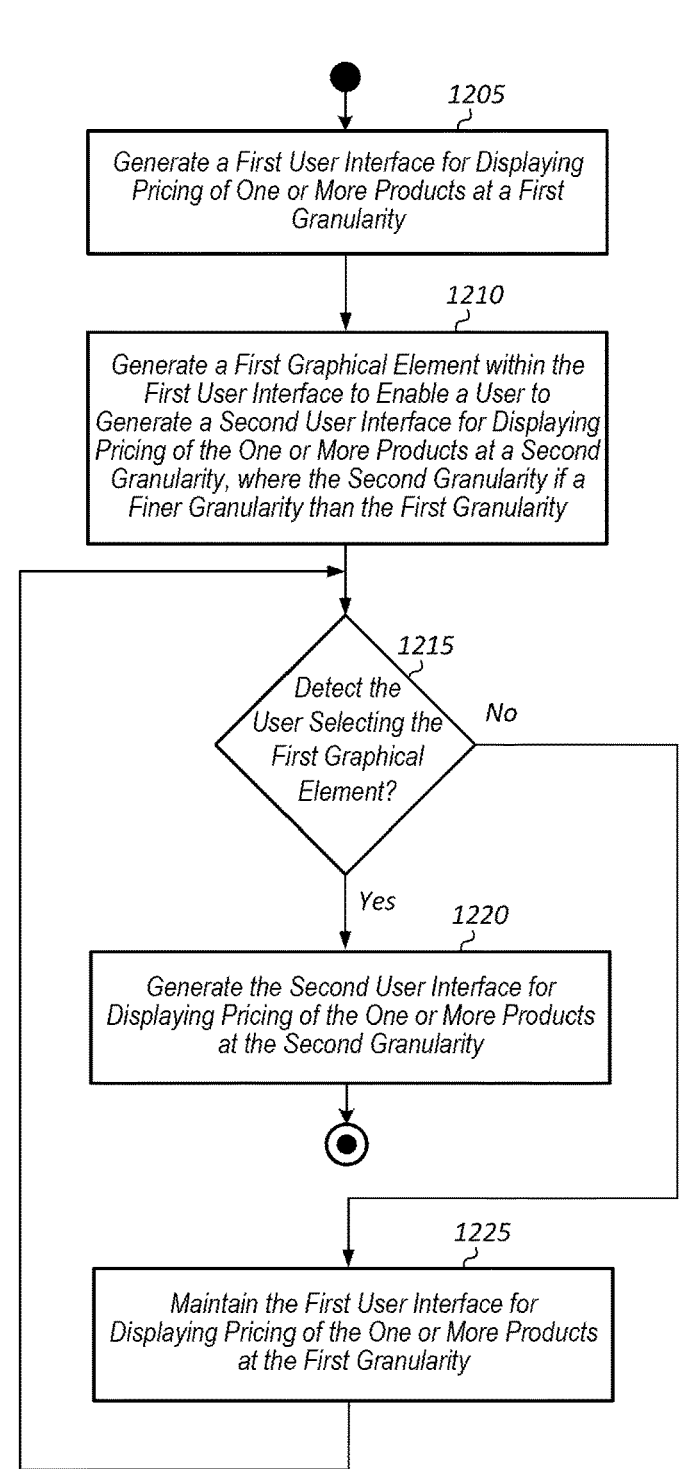
FIG. 12 illustrates an example of a process for initiating a pricing insight application, in accordance with some example implementations of the current subject matter.

Turning now to FIG. 12, a flow diagram illustrating a process for initiating a pricing insight application is shown. At the beginning of method 1200, a computing system generates a first user interface (UI) for displaying pricing of one or more products at a first granularity (block 1205). In an example, the first granularity refers to pricing information such as list price, total discount, and net price of a product. The computing system generates a first graphical element (e.g., button, link) within the first UI to enable a user (e.g., a sales representative) to generate a second UI for displaying pricing of the one or more products at a second granularity, where the second granularity is a finer granularity than the first granularity (block 1210). In an example, the second granularity refers to more detailed pricing information of a product as compared to the first granularity. In an example, the second granularity refers to pricing information such as information on how list prices and net prices are calculated, net total contract value per product type, net total contract value per solution area, net total contract value per year, net total contract value per quarter, net total contract value per month, surcharges, automatically calculated discounts, rounding rules, currency conversion details, condition customizing details, sales representative bonuses and/or incentives, and so on.

If the computing system detects the user selecting the first graphical element (conditional block 1215, "yes" leg), then the computing system generates the second UI associated with a second application for displaying pricing of the one or more products at a second granularity (block 1220). After block 1220, method 1200 may end. Otherwise, if the computing system does not detect a selection the first element by the user (conditional block 1215, "no" leg), then the computing system maintains the first UI (block 1225), and then method 1200 returns to conditional block 1215. Any of the components of the computing systems described herein may be employed to perform method 1200.

Figure 13A:
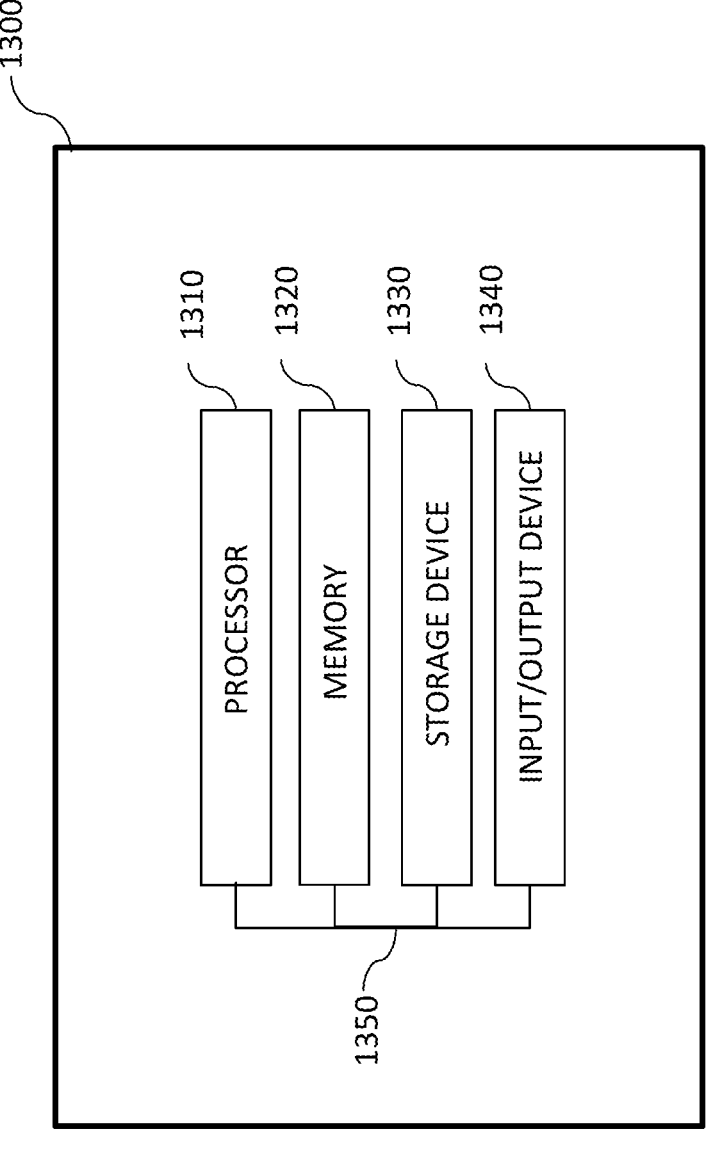
FIG. 13A depicts an example of a system, in accordance with some example implementations of the current subject matter.

In some implementations, the current subject matter may be configured to be implemented in a system 1300, as shown in FIG. 13A. The system 1300 may include a processor 1310, a memory 1320, a storage device 1330, and an input/output device 1340. Each of the components 1310, 1320, 1330 and 1340 may be interconnected using a system bus 1350. The processor 1310 may be configured to process instructions for execution within the system 1300. In some implementations, the processor 1310 may be a single-threaded processor. In alternate implementations, the processor 1310 may be a multi-threaded processor. The processor 1310 may be further configured to process instructions stored in the memory 1320 or on the storage device 1330, including receiving or sending information through the input/output device 1340. The memory 1320 may store information within the system 1300. In some implementations, the memory 1320 may be a computer-readable medium. In alternate implementations, the memory 1320 may be a volatile memory unit. In yet some implementations, the memory 1320 may be a non-volatile memory unit. The storage device 1330 may be capable of providing mass storage for the system 1300. In some implementations, the storage device 1330 may be a computer-readable medium. In alternate implementations, the storage device 1330 may be a floppy disk device, a hard disk device, an optical disk device, a tape device, non-volatile solid-state memory, or any other type of storage device. The input/output device 1340 may be configured to provide input/output operations for the system 1300. In some implementations, the input/output device 1340 may include a keyboard and/or pointing device. In alternate implementations, the input/output device 1340 may include a display unit for displaying graphical user interfaces.

Figure 13B:
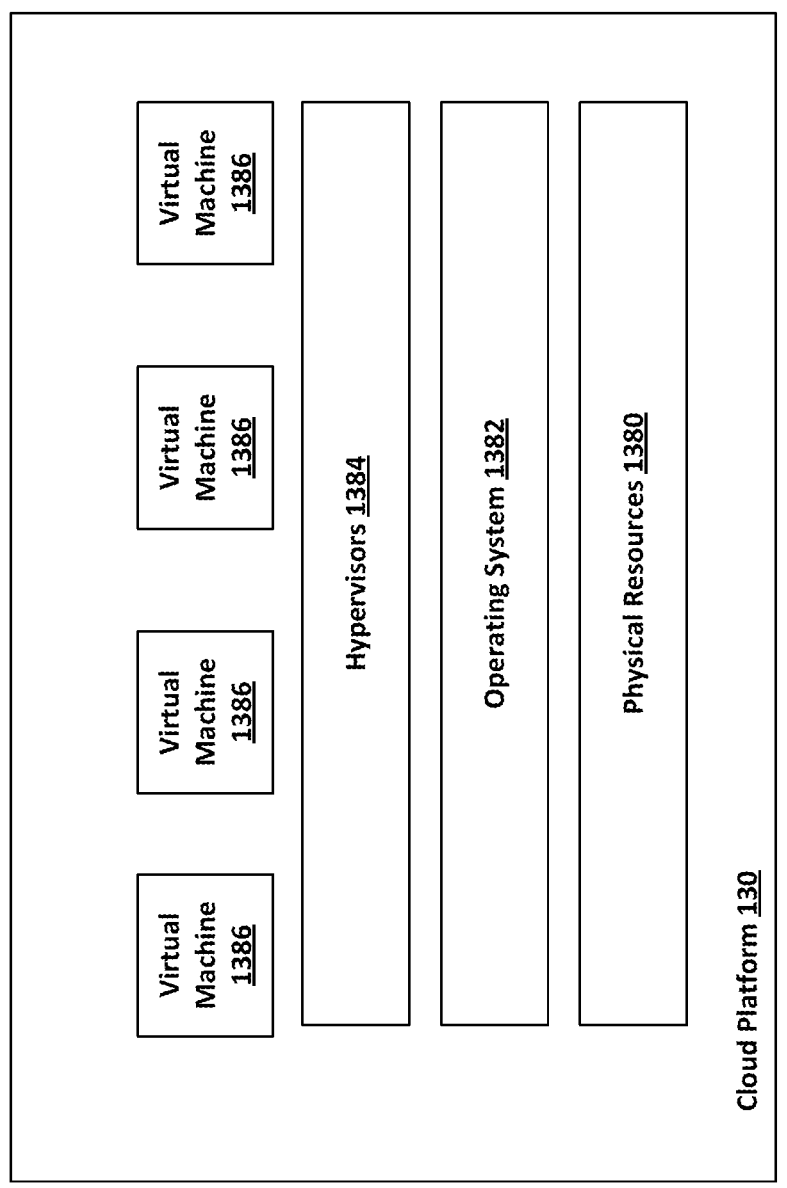
FIG. 13B depicts another example of a system, in accordance with some example implementations of the current subject matter.

FIG. 13B depicts an example implementation of a cloud platform 130 (of FIG. 1), which provides cloud services. The cloud platform 130 may be implemented using various physical resources 1380, such as at least one hardware servers, at least one storage, at least one memory, at least one network interface, and the like. The cloud platform 130 may also be implemented using infrastructure, as noted above, which may include at least one operating systems 1382 for the physical resources and at least one hypervisor 1384 (which may create and run at least one virtual machine 1386). For example, each multitenant application may be run on a corresponding virtual machine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid-state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method, comprising: generating, by a first application, a first user interface to display a pricing quote to a user; detecting a request by the user for an enhanced view of the pricing quote; responsive to detecting the request: retrieving first data from a second application and second data from a pricing and configuration service; populating a temporary database with the first data and the second data; performing data enrichment of the first data and the second data to create third data by translating technical information of the first data and the second data into a user-friendly notation; and generating a second user interface to display, to the user, the third data associated with the pricing quote.

Example 2: The method of Example 1, wherein the second user interface displays one or more visual diagrams illustrating one or more calculations used for generating the pricing quote.

Example 3: The method of any of Examples 1-2, wherein the one or more visual diagrams comprise a bubble chart.

Example 4: The method of any of Examples 1-3, wherein a size of each bubble is determined by a net total contract value of a corresponding product, wherein a vertical location of each bubble in a vertical direction is determined by an amount of a discount for the corresponding product, and wherein a horizontal location of each bubble in a horizontal direction is determined by a pricing indicator of the corresponding product.

Example 5: The method of any of Examples 1-4, wherein the one or more visual diagrams comprise a price waterfall diagram.

Example 6: The method of any of Examples 1-5, wherein the second user interface displays a listing of net total contract value per a given time period on a product-by-product basis.

Example 7: The method of any of Examples 1-6, further comprising generating a first recommendation for a first product which can result in an increased bonus to the user if a corresponding discount is reduced.

Example 8: The method of any of Examples 1-7, wherein the second user interface displays an indication of the first recommendation for the first product.

Example 9: The method of any of Examples 1-8, wherein the first user interface displays the pricing quote at a first granularity, and wherein the second user interface displays the third data at a second granularity.

Example 10: The method of any of Examples 1-9, wherein the second granularity is a finer granularity than the first granularity.

Example 11: A system, comprising: at least one processor; and at least one memory including program instructions which when executed by the at least one processor causes operations comprising: generating, by a first application, a first user interface to display a pricing quote to a user; detecting a request by the user for an enhanced view of the pricing quote; responsive to detecting the request: retrieving first data from a second application and second data from a pricing and configuration service; populating a temporary database with the first data and the second data; performing data enrichment of the first data and the second data to create third data by translating technical information of the first data and the second data into a user-friendly notation; and generating a second user interface to display, to the user, the third data associated with the pricing quote.

Example 12: The system of Example 11, wherein the second user interface displays one or more visual diagrams illustrating one or more calculations used for generating the pricing quote.

Example 13: The system of any of Examples 11-12, wherein the one or more visual diagrams comprise a bubble chart.

Example 14: The system of any of Examples 11-13, wherein a size of each bubble is determined by a net total contract value of a corresponding product, wherein a vertical location of each bubble in a vertical direction is determined by an amount of a discount for the corresponding product, and wherein a horizontal location of each bubble in a horizontal direction is determined by a pricing indicator of the corresponding product.

Example 15: The system of any of Examples 11-14, wherein the one or more visual diagrams comprise a price waterfall diagram.

Example 16: The system of any of Examples 11-15, wherein the second user interface displays a listing of net total contract value per a given time period on a product-by-product basis.

Example 17: The system of any of Examples 11-16, wherein the program instructions are further executable by the at least one processor to cause operations comprising generating a first recommendation for a first product which can result in an increased bonus to the user if a corresponding discount is reduced.

Example 18: The system of any of Examples 11-17, wherein the second user interface displays an indication of the first recommendation for the first product.

Example 19: The system of any of Examples 11-18, wherein the first user interface displays the pricing quote at a first granularity, and wherein the second user interface displays the third data at a second granularity, and wherein the second granularity is a finer granularity than the first granularity.

Example 20: A non-transitory computer readable medium storing instructions, which when executed by at least one data processor, cause operations comprising: generating, by a first application, a first user interface to display a pricing quote to a user; detecting a request by the user for an enhanced view of the pricing quote; responsive to detecting the request: retrieving first data from a second application and second data from a pricing and configuration service; populating a temporary database with the first data and the second data; performing data enrichment of the first data and the second data to create third data by translating technical information of the first data and the second data into a user-friendly notation; and generating a second user interface to display, to the user, the third data associated with the pricing quote.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method performed by a computing system, comprising:

generating, by a first application operating on a cloud platform, a first user interface to display a pricing quote;

detecting, from a client device in communication with the cloud platform via a network, a request for an enhanced view of the pricing quote based on a selection of a graphical element in the first user interface;

responsive to detecting the request:

orchestrating, by the first application, application programming interface (API) calls to each of a second application and a pricing and configuration service to retrieve first data from the second application and second data from the pricing and configuration service, wherein the second application and the pricing and configuration service operate as separate entities on the cloud platform;

populating a temporary database stored in the cloud platform with the first data and the second data;

performing data enrichment of the first data and the second data to create third data by translating technical information of the first data and the second data into a user-friendly notation, wherein the third data is stored in the temporary database to enable graphical display of the third data; and generating, by the first application and via access to the temporary database, a second user interface to display the third data associated with the pricing quote.

2. The method of claim 1, wherein the second user interface displays one or more visual diagrams illustrating one or more calculations used for generating the pricing quote.

3. The method of claim 2, wherein the one or more visual diagrams comprise a bubble chart.

4. The method of claim 3, wherein a size of each bubble is determined by a net total contract value of a corresponding product, wherein a vertical location of each bubble in a vertical direction is determined by an amount of a discount for the corresponding product, and wherein a horizontal location of each bubble in a horizontal direction is determined by a pricing indicator of the corresponding product.

5. The method of claim 2, wherein the one or more visual diagrams comprise a price waterfall diagram.

6. The method of claim 1, wherein the second user interface displays a listing of net total contract value per a given time period on a product-by-product basis.

7. The method of claim 1, further comprising generating a first recommendation for a first product which can result in an increased bonus if a corresponding discount is reduced.

8. The method of claim 7, wherein the second user interface displays an indication of the first recommendation for the first product.

9. The method of claim 1, wherein the first user interface displays the pricing quote at a first granularity, and wherein the second user interface displays the third data at a second granularity.

10. The method of claim 9, wherein the second granularity is a finer granularity than the first granularity.

11. A system, comprising:

at least one processor; and at least one memory including program instructions which when executed by the at least one processor causes operations comprising:

generating, by a first application operating on a cloud platform, a first user interface to display a pricing quote;

detecting, from a client device in communication with the cloud platform via a network, a request for an enhanced view of the pricing quote based on a selection of a graphical element in the first user interface;

responsive to detecting the request:

orchestrating, by the first application, application programming interface (API) calls to each of a second application and a pricing and configuration service to retrieve first data from the second application and second data from the pricing and configuration service, wherein the second application and the pricing and configuration service operate as separate entities on the cloud platform;

populating a temporary database stored in the cloud platform with the first data and the second data;

performing data enrichment of the first data and the second data to create third data by translating technical information of the first data and the second data into a user-friendly notation, wherein the third data is stored in the temporary database to enable graphical display of the third data; and generating, by the first application and via access to the temporary database, a second user interface to display the third data associated with the pricing quote.

12. The system of claim 11, wherein the second user interface displays one or more visual diagrams illustrating one or more calculations used for generating the pricing quote.

13. The system of claim 12, wherein the one or more visual diagrams comprise a bubble chart.

14. The system of claim 13, wherein a size of each bubble is determined by a net total contract value of a corresponding product, wherein a vertical location of each bubble in a vertical direction is determined by an amount of a discount for the corresponding product, and wherein a horizontal location of each bubble in a horizontal direction is determined by a pricing indicator of the corresponding product.

15. The system of claim 12, wherein the one or more visual diagrams comprise a price waterfall diagram.

16. The system of claim 11, wherein the second user interface displays a listing of net total contract value per a given time period on a product-by-product basis.

17. The system of claim 11, wherein the program instructions are further executable by the at least one processor to cause operations comprising generating a first recommendation for a first product which can result in an increased bonus if a corresponding discount is reduced.

18. The system of claim 17, wherein the second user interface displays an indication of the first recommendation for the first product.

19. The system of claim 11, wherein the first user interface displays the pricing quote at a first granularity, and wherein the second user interface displays the third data at a second granularity, and wherein the second granularity is a finer granularity than the first granularity.

20. A non-transitory computer readable medium storing instructions, which when executed by at least one data processor, cause operations comprising:

generating, by a first application operating on a cloud platform, a first user interface to display a pricing quote;

detecting, from a client device in communication with the cloud platform via a network, a request for an enhanced view of the pricing quote based on a selection of a graphical element in the first user interface;

responsive to detecting the request:

orchestrating, by the first application, application programming interface (API) calls to each of a second application and a pricing and configuration service to retrieve first data from the second application and second data from the pricing and configuration service, wherein the second application and the pricing and configuration service operate as separate entities on the cloud platform;

populating a temporary database stored in the cloud platform with the first data and the second data;

performing data enrichment of the first data and the second data to create third data by translating technical information of the first data and the second data into a user-friendly notation, wherein the third data is stored in the temporary database to enable graphical display of the third data; and generating, by the first application and via access to the temporary database, a second user interface to display the third data associated with the pricing quote.

* * * * *